United States Patent Office 2,977,980
Patented Apr. 4, 1961

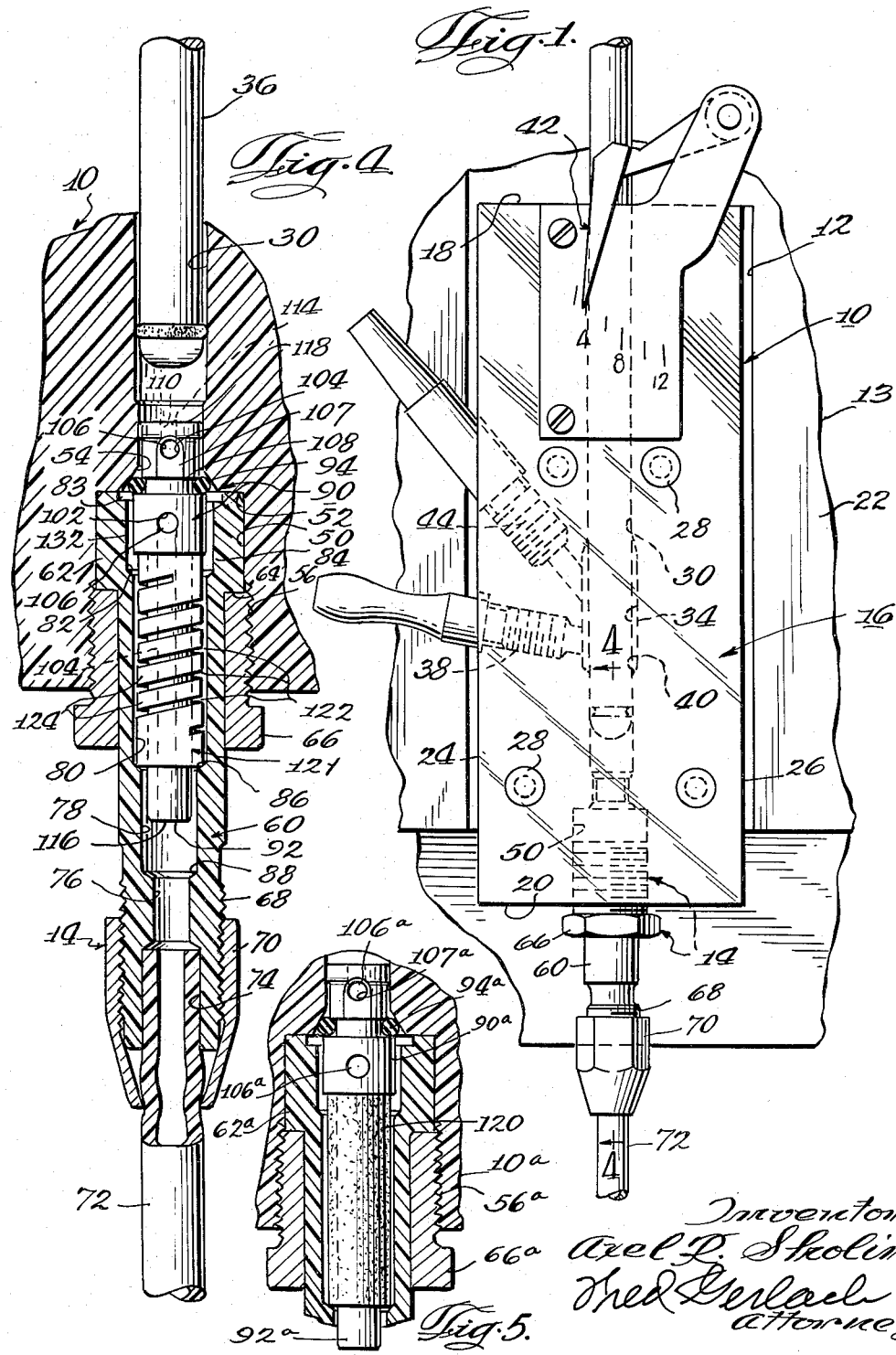

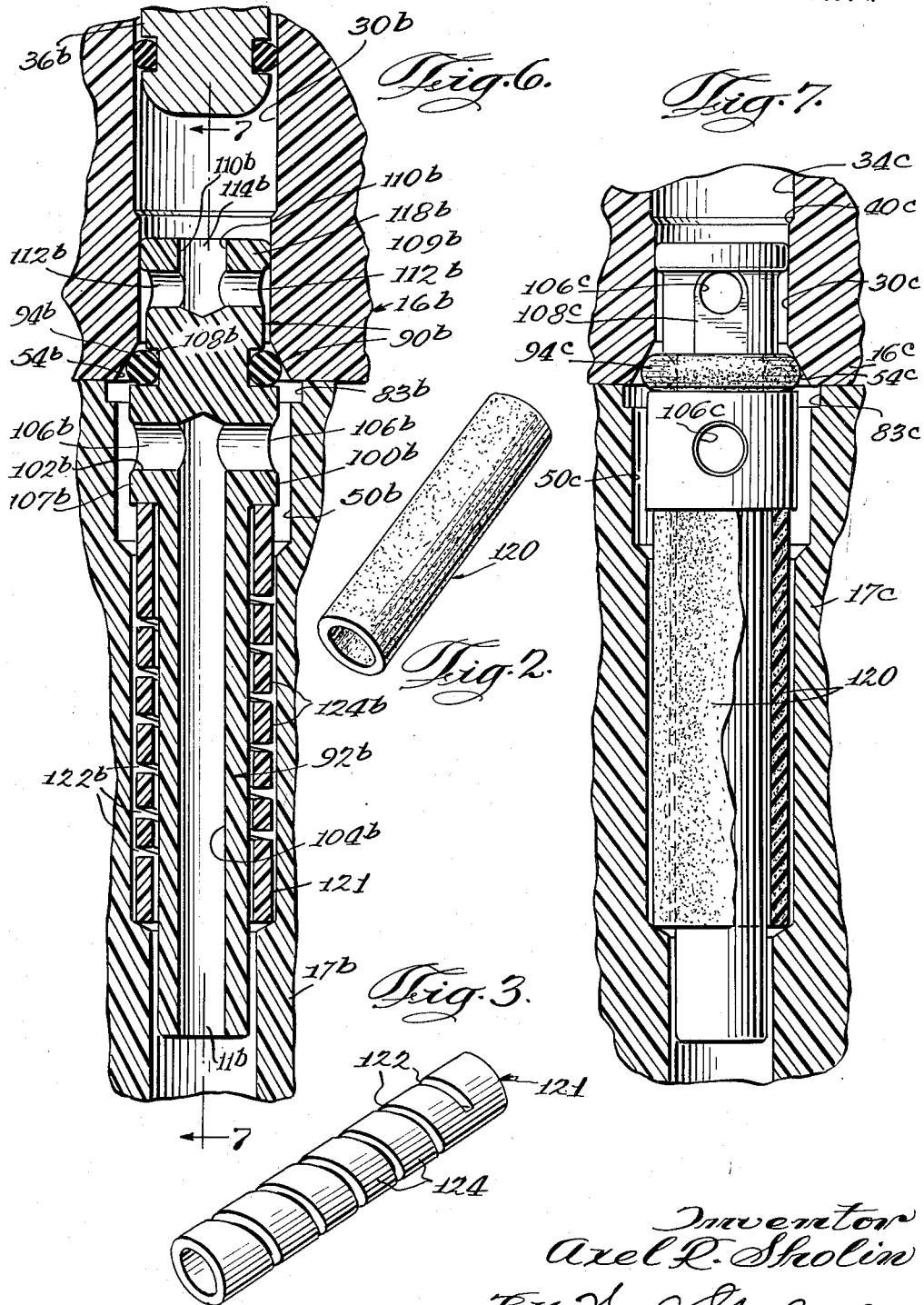

2,977,980
UNIDIRECTIONAL VALVE FOR METERING PUMPS AND THE LIKE

Axel R. Scholin, 4820 N. Paulina Ave., Chicago, Ill.

Filed Apr. 22, 1958, Ser. No. 730,181

3 Claims. (Cl. 137—538)

The improved unidirectional valve construction comprising the present invention has been designed for use primarily in connection with metering apparatus of the type shown and described in my copending application, Serial No. 690,119, filed on October 14, 1957, and entitled "Metering Apparatus With Automatic Cut-Off" (now United States Letters Patent No. 2,952,209), wherein a plunger, operating within a fluid chamber provided in a metering pump block or casing, is adapted periodically to eject measured quantities of a purifying or treatment liquid such as chlorine or fluorine, maintained in the chamber at atmospheric pressure, and force the same through a unidirectional or check valve which is interposed in a fluid conduit between the fluid chamber and a body of water maintained at a relatively high pressure, for example, in a water pipe which supplies household water to an isolated farm residence, or a body of water in a swimming pool. When used in connection with apparatus of this type, the check valve of the present invention is adapted to be so interposed in the fluid conduit to admit or inject measured charges of the purifying or treatment liquid into the larger body of water while at the same time preventing backing up or return of such water into the fluid chamber of the metering pump. The invention is however capable of other uses and, if desired, the check valve of the present invention may, with or without modification, be employed for controlling the unidirectional flow of a liquid at a relatively low pressure through a tube, pipe, duct or other conduit leading to a quantity of liquid contained in a conduit, receptacle, reservoir, chamber or the like and maintained at a relatively higher pressure. Irrespective however of the particular use to which the present invention may be put, the essential features of the same are at all times preserved.

The check valve of the present invention, when employed as outlined above in connection with a metering pump, is of a built-in character, which is to say that it is comprised of certain valve instrumentalities which cooperate with a machined bore or recess in the metering pump block in such a manner as to produce the desired unidirectional valve action. It will be understood however that when applied to other uses, the present check valve may be designed as a self-contained valve assembly having as an essential element thereof its own valve casing, machined in the manner described above to provide the necessary bore or recess for cooperation with such valve instrumentalities to produce such desired unidirectional valve action.

Heretofore, in connection with hydraulic systems employing so-called "chemical pumps" for impelling highly corrosive liquids such as caustic solutions, strong acids and the like, the check valves associated with such systems have proven to be short lived due to the deleterious effect of the liquid upon the metallic springs by means of which the valve elements associated with such valves are pressed against their seats. This has necessitated frequent shut-downs for spring replacement or other valve repair or for valve substitution. Special valves have been designed wherein the springs have been isolated from the path of flow of the liquid but such valves require auxiliary sealing devices, complex by-pass or other passages, special spring retainers, and otherwise are difficult to machine and are thus costly.

The present invention is designed to overcome the above noted limitations that are attendant upon the construction and use of conventional check valves designed for a similar purpose and, toward this end, it contemplates the provision of a check valve construction wherein the spring element associated with the same and by means of which the valve or sealing element proper is yieldingly pressed against its seat is in the form of a tubular sleeve-like member formed of rubber or other elastomeric material which is resistant to the deleterious action of acid or caustic solutions and which, itself, provides a smooth unobstructed passage for the flow of the liquid therethrough so that there will be no back pressure or other retarding effect upon the flowing liquid undergoing metering.

The provision of a check valve of this sort being among the principal objects of the present invention, it is a further object to provide a valve wherein the various component parts of the valve, including all casing parts, sealing elements, retaining devices and other instrumentalities, both movable and stationary, are generally circular in transverse cross section and are coaxial, thus contributing materially toward economy of manufacture, particularly insofar as machining operations are concerned.

Yet another object of the invention, in a check valve of this character, is to provide a check valve assembly wherein all of the component parts thereof, except for certain fitting nipples associated therewith, are constructed of anti-corrosive materials, and wherein such fittings are themselves maintained isolated from contact with the liquid undergoing pumping.

A still further object of the invention is to provide such a check valve assembly wherein extremely small valve element displacement is required to effect full flow of liquid through the valve, thus providing a valve structure which may, if required, be constructed with relatively short longitudinal dimensions for space conservation purposes.

The provision of a check valve which is comprised relatively of few parts and which therefore is economical to manufacture and easy to assemble; one which is extremely simple in its construction and which therefore is unlikely to get out of order; one which is compact in its design, and one which otherwise is well adapted to perform the services required of it, are further desirable features which have been borne in mind in the production and development of the present invention.

With these and other objects in view, which will become more readily apparent as the nature of the invention is better understood, the same consists in the novel construction, combination, and arrangement of parts shown in the accompanying two sheets of drawings forming a part of this specification.

In these drawings:

Fig. 1 is a fragmentary side elevational view of a metering pump assembly showing the improved check valve assembly operatively applied to the discharge outlet of the pump;

Fig. 2 is a perspective view of a combined pressure applying and sealing element capable of being employed in connection with the check valve assembly of Fig. 1;

Fig. 3 is a perspective view similar to Fig. 2 showing a modified form of combined pressure applying and sealing element likewise capable of being employed in connection with the check valve assembly of Fig. 1;

Fig. 4 is an enlarged sectional view, partly in elevation, taken substantially along the line 4—4 of Fig. 1 with the combined pressure applying and sealing device of Fig. 3 installed in the check valve assembly;

Fig. 5 is a fragmentary sectional view similar to Fig. 4 showing the combined pressure applying and sealing device of Fig. 2 installed within the check valve assembly;

Fig. 6 is a fragmentary sectional view similar to Fig. 4 taken substantially centrally through a modified form of a check valve assembly, showing the same operatively installed within a two-part, separable pump assembly and utilizing the combined pressure applying and sealing element of Fig. 3; and Fig. 7 is a fragmentary sectional view taken substantially along the line 7—7 of Fig. 6 with the combined pressure applying and sealing element of Fig. 2 being substituted for the combined pressure applying and sealing element of Fig. 3.

Referring now to the drawings in detail and in particular to Figs. 1 and 4, a metering pump assembly is designated in its entirety at 10 and is shown as being operatively mounted within a recess 12 provided in a wall mounted panel construction 13. The metering pump 10 has operatively associated therewith one form of check valve assembly 14 constructed in accordance with the principles of the present invention. The check valve assembly 14 is capable of use in other environments, and the metering pump 10 disclosed herein is purely exemplary and may be substantially the same as that shown and described in my above-mentioned copending application. Reference may be had to said copending application for a full disclosure and understanding of the sealing pump 10 but for purposes of description herein it is deemed sufficient to state that the same involves in its general organization a generally rectangular solid block-like body 16, preferably formed of a transparent plastic material such as Lucite presenting upper and lower end faces 18 and 20 respectively, a front face 22, a rear face (not shown), and side faces 24 and 26 respectively. A series of anchoring screws 28 extend transversely through the block 16 and serve to secure the same in position on the panel 14.

The block 16 is formed with a vertical bore 30 therethrough having an enlarged counterbore 34 in the medial regions of the block, the counterbore constituting, in effect, a pump chamber from which a purifying or treatment liquid is adapted to be periodically forced under the influence of a plunger 36 which is reciprocable within the bore 30 and the lower end of which extends into the counterbore 34. Means are provided for reciprocating the plunger 36 between a raised position wherein the extreme lower end of the plunger is disposed within the pump chamber 34 and a lowered position wherein this end of the plunger enters the portion of the bore 30 below the pump chamber. When the plunger 36 is raised, the treatment or purifying liquid is adapted to flow into the pump chamber under the influence of gravity through a lateral duct 38 and, as the plunger 36 descends, the lower end thereof encounters a cut-off shoulder 40 at the lower end of the chamber 34 and forces a measured quantity of the liquid downwardly in the bore 36 and through the check valve assembly 14 of the present invention, all in a manner that will be made clear presently. Means are also provided whereby the amplitude of the effective stroke of the plunger 36 may be varied and an indicating device 42 is provided for the purpose of ascertaining the length of the plunger stroke. The means for actuating the plunger and the indicating means 42 form no part of the present invention and the disclosure of the indicating means 42 herein is merely incidental. A return duct 44 extends laterally through the block 16 on an incline and is provided for the purpose of returning any excess liquid to the source from the chamber 34.

The metering pump assembly 10 of Figs. 1 and 4 utilizes a single unitary valve block 16 and the lower face 20 thereof is drilled to provide a relative deep socket 50 which is coaxial with the bore 30 and is in communication with the latter. The bottom wall of the socket presents an annular shoulder 52 which surrounds a frusto-conical valve seat 54. The outer region of the wall of the socket 50 is threaded as at 56 for a purpose that will be made clear presently. The socket 50 is adapted to receive therein one end of an elongated tubular attachment sleeve 60. This end of the sleeve 60 is provided with an enlarged head 62 providing a downwardly facing shoulder 64 adapted to be engaged by the forward end of a nipple 66 which is threadedly received within the threaded portion 56 of the socket 50 and by means of which the upper end of the sleeve 60 is secured within the socket.

The sleeve 60, in combination with a limited portion of the bore 30 including the valve seat 54, constitutes in effect a casing for the check valve assembly 14. The lower end of the sleeve 60 is exteriorly threaded as at 68 and is designed for threaded reception thereover of an attachment nipple 70 by means of which one end of a conduit in the form of a length of metal tubing 72 may be held in operative sealing position within a socket 74 provided at the discharge end of the sleeve 60. The sleeve 60 is formed with a central bore 76 therethrough, of which bore the socket 74 constitutes an enlarged counterbore.

The bore 76 is provided with a series of counterbores of progressively increasing diameter, extending upwardly from the bore proper 76 through the sleeve. These counterbores are designated at 78, 80, 82 and 83 respectively. An upwardly facing shoulder 84 establishes the juncture between the two counterbores 80 and 82. An upwardly facing shoulder 86 establishes the junction between the two counterbores 78 and 80. An upwardly facing shoulder 88 establishes the juncture between the counterbore 78 and the bore 76.

A longitudinally shiftable valve assembly designated in its entirety at 90 is slidably disposed within the sleeve 60 and it extends completely through the counterbores 82 and 80 and projects into the counterbore 78. This valve assembly 90 is comprised of two parts, namely a plunger 92 (Fig. 5) and a sealing ring 94 in the form of an O-ring.

The plunger 92 is formed with an enlarged portion 100 a slight distance below its upper end and a transverse bore 102 extends diametrically through the enlarged portion and intersects an elongated longitudinal bore 104 which extends centrally through a major extent of the plunger and provides a fluid passage in the plunger. The intersection of the bores 102 and 104 provides, in effect, a pair of radially extending aligned passages 106 (Fig. 6) in communication with the bore 104. The plunger and O-ring assembly 90c of Fig. 6 is identical with the plunger and O-ring assembly 90 of Fig. 4 and the description herein of such assembly may be considered in connection with both Figs. 4 and 6, although a different environment for the assembly is employed in Fig. 6 as will be described subsequently. The plunger 92 is formed with an annular groove 108 immediately above the enlarged portion 100 and the O-ring 94 is disposed within this groove. The outer cylindrical face of the enlargement 100 is formed with a pair of flattened clearance regions 107 which extend between the two passages 106 and the annular groove 108 and which serve to effect fluid communication between these passages and the groove.

Adjacent the extreme upper end of the plunger 92 there is provided a transverse bore or passage 109 which intersects a relatively short longitudinal bore 110, thus providing a pair of radially extending aligned passages 112 in communication with the bore 110. The upper end of the bore 110 establishes a fluid inlet 114 for the assembly 90 while the lower end of the bore 104 establishes a fluid outlet 116 for the assembly.

When the plunger 92 is operatively disposed within the bore 78, the upper end region 118 thereof above the enlarged portion 100 is slidably piloted within the bore 30 provided in the block 16, while the lower end region of the plunger 92 is slidably piloted within the counterbore 78. The plunger 92 as a whole is therefore maintained in substantial axial alignment with the common axis of the two bores 30 and 76.

The O-ring 94 is preferably formed of an elastomeric material such as a synthetic rubber or a rubber substitute which is impervious to the deleterious action of the particular treatment or purifying liquid undergoing pumping, or it may be formed of Teflon or other plastic material which resists the corrosive action of the liquid. This sealing member 94 is designed for cooperation with the frusto-conical valve seat 54 under the influence of a resilient expansible and contractible member which, alternatively, may assume the form of the member 120 of Fig. 3 or of the member 121 of Fig. 2. The member 121 of Fig. 3 has been shown installed in the check valve assembly 14 of Figs. 1 and 4 and a description thereof will be followed by a description of the alternatively useable member 120 of Fig. 2.

In the form of check valve assembly illustrated in Figs. 1 and 4, the sleeve 60, plunger 90 and member 121 may be formed of the same material, the material being of a non-corrosive nature capable of resisting the corrosive action of the treatment or purifying liquid. Various materials suitable for use in connection with the present invention are available in tubular form and the three parts 60, 90 and 121 may be machined from respective sections of such rod stock. The member 121 is of generally cylindrical configuration and the medial region thereof is provided with an elongated helical slot 122 which affords intervening helical convolutions 124 so that this medial region, in effect, is of helical spring form. The slot 122 may be formed in the member 121 by a machining operation wherein a portion of the material of the member is removed, thus leaving the adjacent convolutions 124 slightly spaced from each other. The material of the member 121 is possessed of a certain degree of resiliency so that the member is capable of being compressed upon application of compressional forces to the opposite ends thereof, and of resuming its original length when such compressional forces are removed.

The member 121, which hereinafter will be referred to as a sleeve spring, is disposed within the counterbore 80 and surrounds the portion of the tubular plunger 92 below the enlarged portion 100 thereof. The upper end or rim of the sleeve spring 121 bears against the shoulder 82 while the lower end of rim thereof bears against the upwardly facing shoulder 86 at the lower end of the counterbore 80. The plunger 92 is thus normally urged upwardly to seat against the frusto-conical seat surface 54.

In the operation of the check valve assembly 14 described above, it will be seen that upon each downward stroke of the pump plunger 36, after the plunger has moved below the cut-off shoulder 40 at the bottom of the pump chamber 34, the column of liquid within the bore 30 below the plunger will be displaced downwardly and enter the fluid inlet 114 from whence it will pass through the bore 110 and flow radially outwardly through the passages 106 and into the clearance spaces existing between the wall of the bore 30 and the flattened regions 107 on the plunger 92. The unbalanced fluid pressure acting on the upper end of the plunger 92 will cause the plunger to be forced downwardly against the action of the sleeve spring 121 so that the O-ring 94 will become unseated and move into the counterbore 84 whereupon the fluid will then pass from the clearance spaces 130 around the outside of the O-ring 94 and enter the annular space 132 existing between the wall of the counterbore 82 and the outer cylindrical surface of the enlarged portion 100 of the plunger 92. Since the sleeve spring 121 is sealed to the wall of the bore 78 by the shoulder 86 at the bottom of the counterbore 80, the fluid will pass from the annular space 132 and enter the bore 104 from whence it may pass downwardly through the bore 76 and outwardly of the check valve assembly 14 and enter the conduit 72.

Upon upward movement of the pumping plunger 36, the unbalanced fluid pressure exerted on the bottom of the plunger 92, coupled with the force exerted by the sleeve spring 121, will force the same upwardly and cause the O-ring to seat on the frusto-conical surface 54, thereby preventing passage of the liquid upwardly through the check valve assembly.

In the form of the invention shown in Fig. 5, the check valve assembly 14a remains substantially the same as the check valve assembly 14 of Fig. 4 except for the fact that the spring sleeve 120 of Fig. 2 has been substituted for the spring sleeve 121 of Fig. 3. Likewise, the environment of the assembly 14a in a pump construction 10a identical with the pump construction 10 remains unaltered. To avoid needless repetition of description, corresponding reference numerals are employed in the two views with the suffix "a" being applied in Fig. 5.

The pressure applying and sealing sleeve spring 120 is in the form of a tubular member of cylindrical design, the member being imperforate and being formed of an elastomeric material such as synthetic rubber or a rubber substitute which will resist the corrosive action of the treatment or purifying liquid undergoing pumping. In operation, during the pressure stroke of the plunger 36a, the unbalanced forces acting upon the upper end of the plunger 92a will cause the plunger to be forced downwardly against the action of the sleeve spring 120 so that the O-ring 94a will become unseated and fluid will pass through the valve assembly 14a as heretofore described in connection with the form of the invention shown in Fig. 4. However, upon application of compressional forces to the opposite ends of the member 120, the thickness of the wall of the member will be increased slightly so that it will substantially fill the annular space within which it is disposed so that the liquid may not pass downwardly through this space and will be obliged to enter the passages 106a as heretofore described. The inherent resilience of the elastomeric material from which the member 120 is formed is relied upon to maintain the O-ring 94a seated. Otherwise, the operation of the valve assembly 14a is substantially the same as the operation of the valve assembly 14.

In the form of the invention shown in Fig. 6 the check valve assembly 14b is similar to that shown in Fig. 4 and it utilizes the sleeve spring 121 of Fig. 3, but in the environment in which it is shown, the pump assembly 10b is comprised of two separable parts of blocks 16b and 17b arranged in juxtaposition and, in combination with each other, providing a composite bore which exists by virture of the plunger receiving bore 30b and the valve element receiving bore 76b. Again, to avoid needless repetition of description, corresponding reference numerals are employed utilizing the suffix "b" in describing the check valve assembly 14b.

The frusto-conical valve seat 54b is formed at the bottom end of the bore 30b. In this form of the invention, the sleeve member 60 is omitted and the valve element receiving bore 76b is provided directly in the transparent plastic body or block 17b. Otherwise, the construction of the valve assembly 14b and its mode of operation remain substantially the same as the construction and operation of the valve assembly 14.

In the form of the check valve assembly shown in Fig. 7, the check valve assembly 14c is identical with the check valve assembly 14b of Fig. 5 with the exception that the valve element 120 has been substituted for the valve element 121. In Fig. 6 similar reference numerals having the suffix "c" are employed to identify the corresponding parts in the two views. The action of the tubular resilient pressure applying and sealing member 120 in maintaining the O-ring 94c seated on the frusto-conical surface 54b is precisely the same as the action of the tubular sealing member 120 described in connection with the form of the invention shown in Fig. 5.

From the above description, it is thought that the construction, operation, and advantages of the various forms of check valve assemblies 14, 14a, 14b and 14c illustrated in the accompanying drawings will be understood without further description. The invention is not to be limited to the precise arrangement of parts shown in the drawings or described herein as various changes in the details of construction may be resorted to without departing from the spirit of the invention. Only insofar as the invention has particularly been pointed out in the accompanying claims is the same to be limited.

Having thus described my invention, what I claim as new and desire to secure by Letters Patent is:

1. A generally cylindrical check valve assembly comprising in combination means defining a valve casing having a cylindrical longitudinal bore extending completely therethrough and defining at one end a fluid inlet and at the other end a fluid outlet, said bore having an enlarged counterbore medially of its ends, the wall of said bore presenting a frusto-conical valve seat defining a valve opening establishing communication between the inlet end of the bore and the counterbore, an elongated cylindrical valve plunger slidable longitudinally in said bore and passing completely through said counterbore, said plunger having one end thereof slidably piloted in said inlet end of the bore and having its other end slidably piloted in the outlet end of the bore, said plunger being formed with an enlargement medially of its ends and operatively disposed within said counterbore and spaced from the wall thereof, a valve member in the form of an elastomeric sealing ring surrounding said plunger and movable bodily with the plunger into and out of wedging engagement with said frusto-conical valve seat, said plunger being movable between a normally retracted position wherein said sealing ring is sealingly confined between said frusto-conical valve seat and said enlargement and an advanced position wherein said sealing ring is out of engagement with said valve seat, said one piloted end of the plunger being formed with a flat thereon which, in combination with the wall of the bore, defines a clearance region, said plunger being provided with a longitudinally extending fluid passage in communication through the other end of the plunger with said fluid outlet, said enlargement being provided with a transverse fluid passage establishing communication between said longitudinally extending passage and the annular space existing between said enlargement and said counterbore, said one piloted end of the plunger being formed with a fluid passage extending inwardly from the adjacent extreme end of the plunger and communicating with said clearance region through a radially opening port, and spring means within said bore normally urging said plunger to its retracted position.

2. A check valve assembly as defined in claim 1 wherein said outlet end of the bore is formed with an internal annular shoulder and wherein said spring means comprises an imperforate cylindrical elastomeric sleeve surrounding said plunger and having one end in coextensive sealing engagement with said annular shoulder and its other end in sealing engagement with said enlargement on the plunger.

3. A check valve assembly as defined in claim 1 wherein said outlet end of the bore is formed with an internal annular shoulder and wherein said spring means comprises a cylindrical sleeve telescopically received over said plunger and having its lower end in engagement with said shoulder and its upper end in engagement with said enlargement, said sleeve being formed of resilient material and being provided intermediate its ends with a helical slot defining a series of adjacent helical convolutions of the resilient material.

References Cited in the file of this patent

UNITED STATES PATENTS

| | | |
|---|---|---|
| 1,073,719 | Timmer | Sept. 23, 1913 |
| 2,211,252 | Bremser | Aug. 13, 1940 |
| 2,627,818 | Davis | Feb. 10, 1953 |
| 2,675,021 | Allin | Apr. 13, 1954 |
| 2,910,998 | Davis | Nov. 3, 1959 |
| 2,912,002 | Miller | Nov. 10, 1959 |

FOREIGN PATENTS

| | | |
|---|---|---|
| 3,179 | Great Britain | of 1872 |
| 965,351 | France | Sept. 11, 1950 |